United States Patent [19]

Duncanson

[11] 3,852,995
[45] Dec. 10, 1974

[54] METHOD AND APPARATUS FOR DETECTING LEAKS IN CONTAINERS

[75] Inventor: Robert H. Duncanson, Hennepin, Minn.

[73] Assignee: Faberge, Incorporated, New York, N.Y.

[22] Filed: Feb. 23, 1973

[21] Appl. No.: 335,035

[52] U.S. Cl. .................... 73/40, 73/45.2, 73/49.2
[51] Int. Cl. .......................................... G01m 3/16
[58] Field of Search ............ 73/49.2, 49.3, 52, 23, 73/45.2, 45.1, 40, 40.7; 23/230 L, 232 E; 324/33

[56] References Cited
UNITED STATES PATENTS

| | | | |
|---|---|---|---|
| 1,949,767 | 3/1934 | Thompson | 73/45 |
| 3,439,261 | 4/1969 | Loh | 324/33 |
| 3,495,441 | 2/1970 | Laub | 73/45.2 |

*Primary Examiner*—Richard C. Queisser
*Assistant Examiner*—Denis E. Corr
*Attorney, Agent, or Firm*—Davis, Hoxie, Faithfull & Hapgood

[57] ABSTRACT

A method of detecting for leakage from a container of organic molecules in the gaseous or vapor state, by positioning the container adjacent a pair of spaced electrodes, directing a stream of substantially pure air past the exterior surfaces of the pressurized container and between the electrodes, maintaining an electric field of sufficient strength between the pair of electrodes to cause a corona to form about one of the electrodes with a small erratic flow of current between the electrodes, and detecting the greater, more constant current flow resulting from the presence of organic molecules which contaminate the air flowing between the electrodes. The apparatus for leak detection includes a plurality of container testing chambers with associated pairs of electrodes arranged on a rotatable platform, means for continuously energizing the electrodes to cause a corona to form on one electrode with a small erratic current flow between the electrodes, means for directing a stream of substantially pure air into the chambers and past the electrodes, and means for detecting the greater, more constant flow of current between the electrodes as the contaminated stream flows past the electrodes.

13 Claims, 7 Drawing Figures

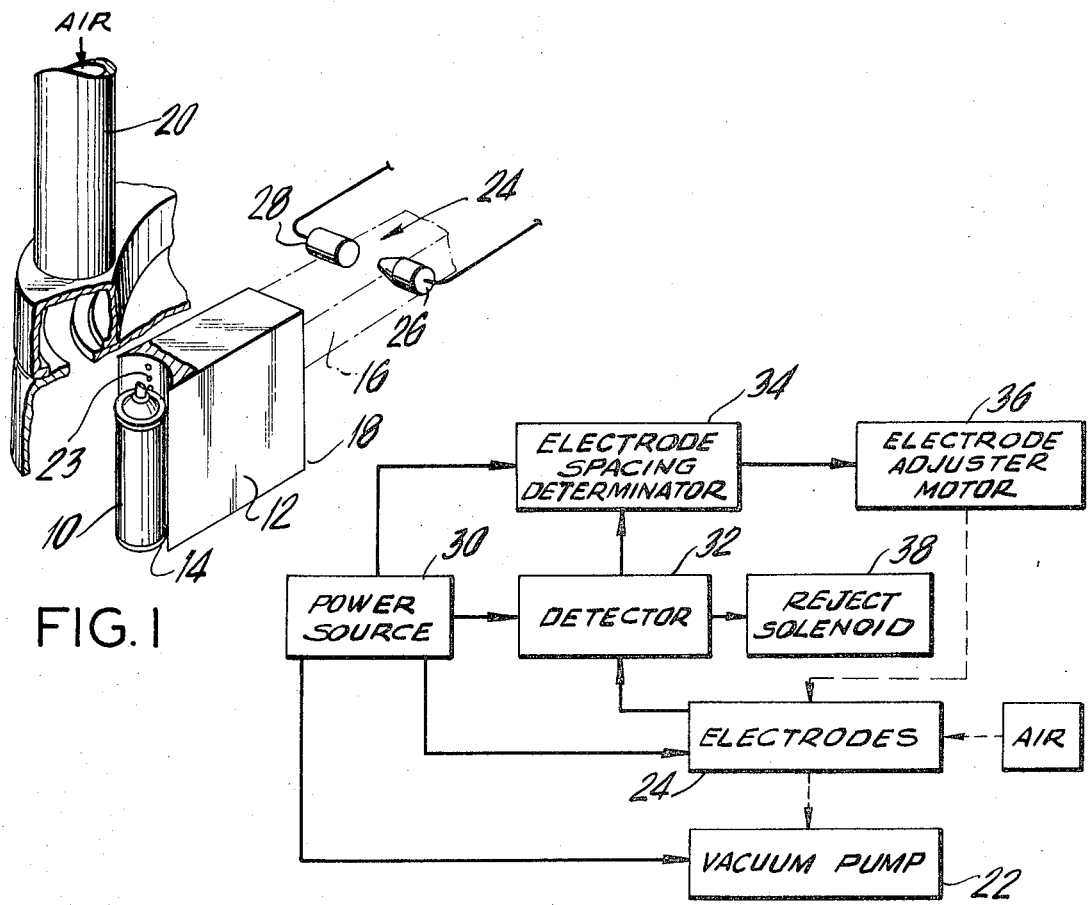
FIG. 1
FIG. 2
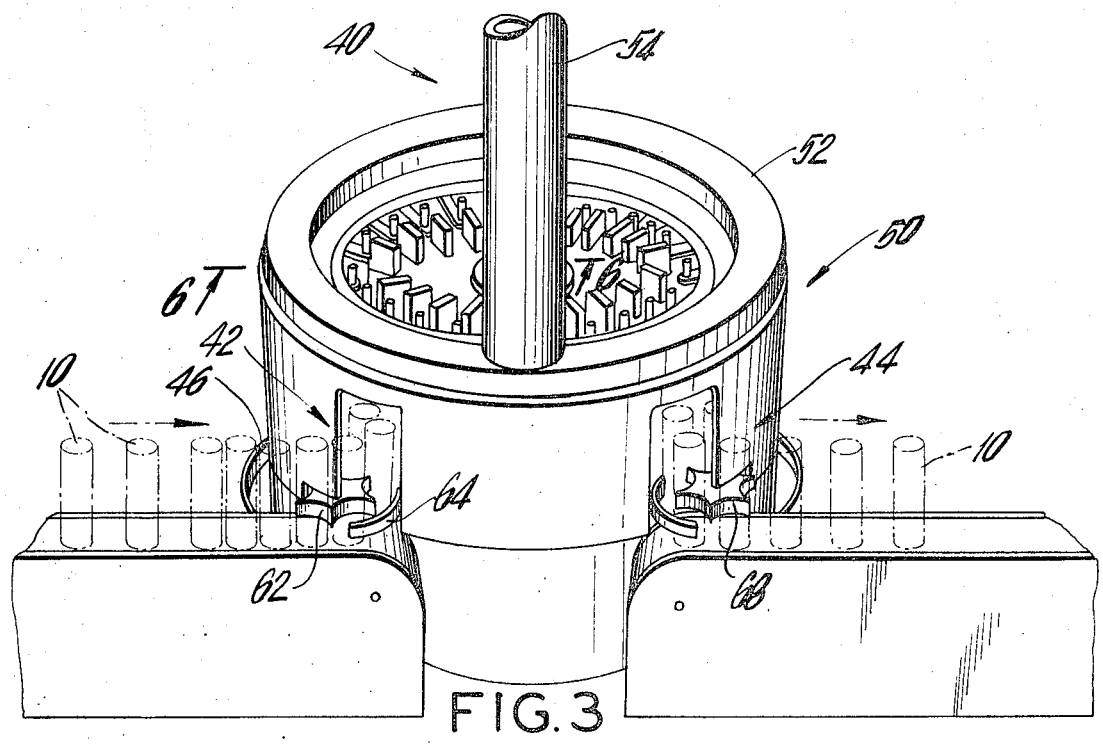
FIG. 3

METHOD AND APPARATUS FOR DETECTING LEAKS IN CONTAINERS

The present invention relates to a method and apparatus for leak detection, and more specifically to a method and apparatus for detecting leakage from containers including hydrocarbon solvents and organic compounds.

Various methods and apparatus for detecting container leakage are known. The most common method used to detect for container leakage is to automatically immerse the containers in a water bath and to manually scrutinize the bath for gas bubbles, the presence of which indicates a defective (leaking) container. (Methods and apparatus are also known for detecting the presence of gaseous impurities, for example, U.S. Letters Pat. No. 3,460,125, granted to L. N. Liebermann et al.)

Other means for leak detection are known, but these means have been found unsatisfactory for checking a high number of containers per minute. It is generally recognized by the container industry that an effective leak detection system should be capable of testing approximately 300 or more containers per minute.

It is an object of the present invention to provide a method and apparatus for detecting leakage from containers.

It is a further object of the present invention to provide a method and apparatus for detecting leakage from containers which is capable of testing a high number of containers per minute.

It is a further object of the present invention to provide a system for automatically detecting leakage from containers which is readily usable in an industrial environment.

Other objects and advantages of the present invention will be apparent when the detailed description is considered with the drawing.

Briefly, the present method is capable of detecting the leakage of organic molecules from a container. The phrase "organic molecules", as used in the specification, includes those molecules which evaporate from hydrocarbon solvents and organic compounds and that exist in a gaseous or vapor state, e.g., alcohol, dimethyl ether, methane, butane, benzene, ethane, etc. The method includes the steps of positioning the pressurized container upstream from a pair of spaced electrodes, directing a stream of substantially pure air past the exterior surfaces of the container and between the electrodes to convey any organic molecules present on and adjacent the exterior surface of the container past the pair of electrodes, continuously impressing an electric field of sufficient strength upon the pair of electrodes to form a corona about one of the electrodes producing a small erratic flow of current between the electrodes, and detecting the greater, more constant current flow resulting from the presence of organic molecules between the electrodes. The apparatus for leak detection includes a plurality of container testing chambers with associated pairs of electrodes arranged on a rotatable wheel, means for continuously energizing the electrodes to cause a corona to form on one electrode, resulting in a small erratic current flow between the electrodes, means for directing a stream of substantially pure air into the chambers and past the electrodes, and means for detecting the greater, more constant current flow between the electrodes resulting from the presence of organic molecules in the stream, as the stream flows past the electrodes.

The present invention is illustrated with the accompanying drawing, in which:

FIG. 1 is a simplified perspective view with parts broken away showing a container positioned in a receptacle adjacent a pair of electrodes;

FIG. 2 is a block diagram of the leak detection system;

FIG. 3 is a perspective view of the apparatus for automatically testing a high volume of containers for leakage;

Figure 4:
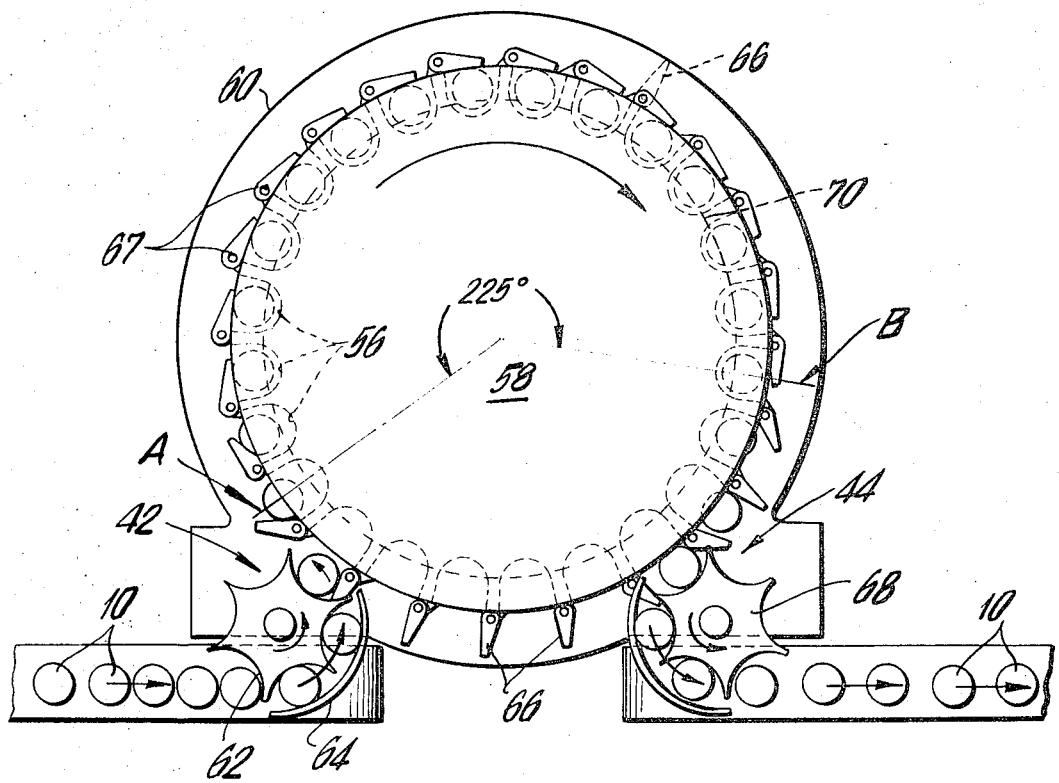
FIG. 4 is a top plan view of the apparatus of FIG. 3 with the pure air distribution system removed for clarity.

Referring to FIG. 1, a container 10 including hydrocarbon solvents and organic compounds, particularly hair spray containing alcohol, is positioned in a receptacle or chamber 12 shaped to receive the container 10. The chamber 12 is open at its front end 14 to receive the container 10 and has an air outlet duct 16 in communication with its rear wall 18.

An air inlet duct 20 is in communication with the front end 14 of the chamber 12 and directs a stream of substantially pure air into the chamber 12. "Substantially pure air" is defined for purposes of this specification as air that is essentially free of dust particles and contaminating gases, e.g., less than about 500 parts per million of gases other than pure air, but not more than about 100 parts of gases that are easily ionized or flammable (comparisons are by weight). Preferably, the stream of substantially pure air is dehumidified to below 50 percent humidity prior to being directed into the chamber 12.

A vacuum pump 22, see FIG. 2, is mechanically coupled to the air outlet duct 16 to draw the substantially pure air around the exterior surfaces of the container 10, through receptacle orifices 23 and through the air outlet duct 16. A pair of spaced electrodes 24 are positioned in the air outlet duct 16 for communciation with the exiting stream of air. Advantageously, one electrode 26 may be sharply pointed to concentrate the electric field. The other electrode 28 may be flat, as desired.

Referring to FIG. 2, the electrodes 24 are energized by an a.c. power source 30 which also energizes the vacuum pump 22. The electrodes 24 are electrically coupled to a detector 32 which is also energized by power source 30. The detector 32 is electrically coupled to an electrode spacing determinator 34, also energized by the power source 30. The output of the determinator 34 is electrically coupled to an electrode adjustment motor 36 which is mechanically linked to the electrodes 24. The pointed electrode 26 may preferably have a radius of 0.001 to 0.004 inches at its tip and for ease of alignment and to concentrate the electric field at the tip of the pointed electrode with a resulting corona about the tip.

The determinator 34 provides adjustment of the electrode spacing or gap in response to the output signals from the detector 32 by energizing the motor 36 to rotate the pointed electrode 26 toward or away from the flat electrode 28. If the stream of air flowing between the electrodes 24 is contaminated, e.g., includes more than about 100 parts per million parts of gases that are easily ionized or flammable (organic molecules) the detector 32 energizes a reject solenoid 38.

The gap or spacing between the electrodes 24 is adjusted to cause a corona at one electrode (the pointed electrode 26) with an erratic current flow, on the order of a few microamps, between the electrodes 24. This condition of a corona at one electrode and an erratic current flow of a few microamps may be referred to as the "first mode" of operation (small average current). Complete ionization of the air between the electrodes caused by the presence of hydrocarbon molecules resulting in a greater, more constant current (on the order of several milliamps) may be referred to as the "second mode" of operation (greater average current).

Referring to FIG. 3, the apparatus 40 of the present invention is illustrated. The apparatus 40 includes an input station 42 to which the containers 10 to be tested are conveyed and an output station 44 from which acceptable (nonleaking) containers 10 are conveyed. Containers 10 which include leaks are rejected into a leaker catch basin 46.

The apparatus 40 includes an air shroud 50 and an air distributor 52 mechanically coupled to the shroud. The air distributor 52 communicates with an air blower, dehumidifier and filter (none of which are shown) through air inlet duct 54. The air distributor 52 and shroud 50 distribute substantially pure air to 24 container cavities 56 rotatably mounted on a wheel 58, see FIG. 4. The wheel 58 rotates about a stationary table 60 onto which the containers 10 are fed.

Figure 5:
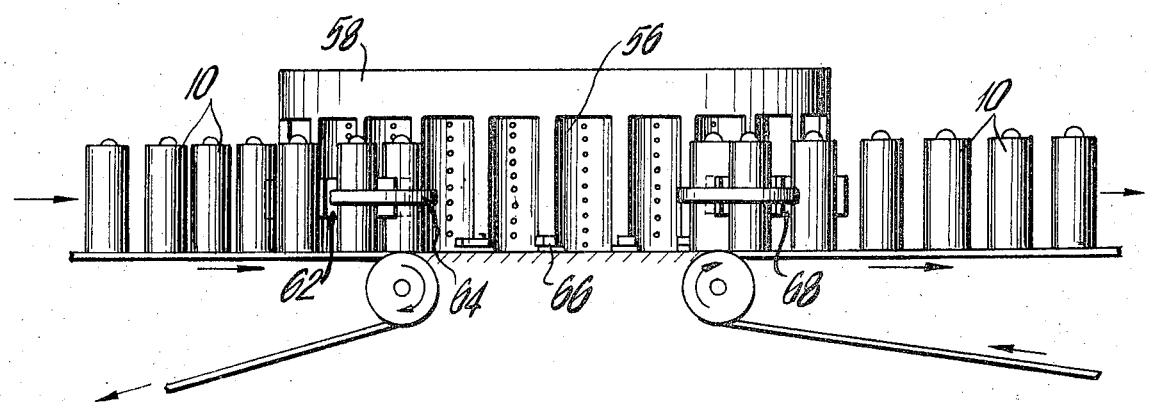
FIG. 5 is a side elevational view of the apparatus of FIG. 4.

Referring to FIGS. 4 and 5, the input station 42 includes a star wheel 62 driven in synchronism with the rotating cavities 56. A guide 64 coacts with the star wheel 62 to direct the individual containers 10 into the cavities 56.

The 24 cavities 56 each include a keeper or control pawl 66 which rotates with the wheel 58. The control pawls 66 are mounted on the wheel 58 adjacent the cavities 56 for pivotal movement relative to the cavities 56. The control pawls 66 are initially arranged tangentially to the cavities 56 in an outwardly extending position. In this outwardly extending position, the pawls 66 engage a container 10 exiting from the star wheel 62 and move it along with the wheel 58. The pawl 66 pivots inwardly about its axis 67 gradually moving the container into the cavity 56. At position A a container 10 is ready for testing.

When a leak is detected in a container 10, the pawl 66 pivots outwardly and again assumes an outwardly extended position, see the dotted pawl 66 shown in FIG. 4. Since the wheel 58 is rotating while the pawl is in its outwardly extended position, the container 10 is forced to slide tangentially i.e., along the outwardly extending pawl 66 until it falls off the table 60 and into the catch basin 46. If the container 10 does not leak it remains in the cavity 56 and does not begin to exit therefrom until it reaches position B. At position B the pawl 66 begins to pivot outwardly and the container 10 begins to slide along the pawl 66. The container 10 is engaged by star wheel 68 at the output station 44.

Since there are 24 cavities 56 and it is desired to test 300 containers per minute, 300 containers must pass a given point each minute. The wheel 58 is revolved at 12½ revolutions per minute (R.P.M.) which is slow enough so that the resultant centrifugal force will not cause the containers 10 to tip over. Further, since there are 24 cavities 56, each cavity 56 must occupy 15°. The distance between positions A and B, i.e., 15 spaces or 225° is utilized for leak detection. Since each cavity makes a complete revolution in 4.8 seconds (60/12.5 = 4.8 sec), 3 seconds is provided for leak detection (225°/360° × 4.8 = 3 sec.).

It is advantageous to include a roughened portion 70 of the stationary table 60 which lies along the circumference of a circle having a diameter such that the circumference of the circle is below the bottom of the container 10, see FIG. 4. The roughened portion 70 causes the containers 10 to rotate as they slide due to the frictional contact between the bottom of the containers 10 and the roughened portion 70. The roughened surface 70 may be, e.g., a knurl about ¼ inch wide.

Figure 6:
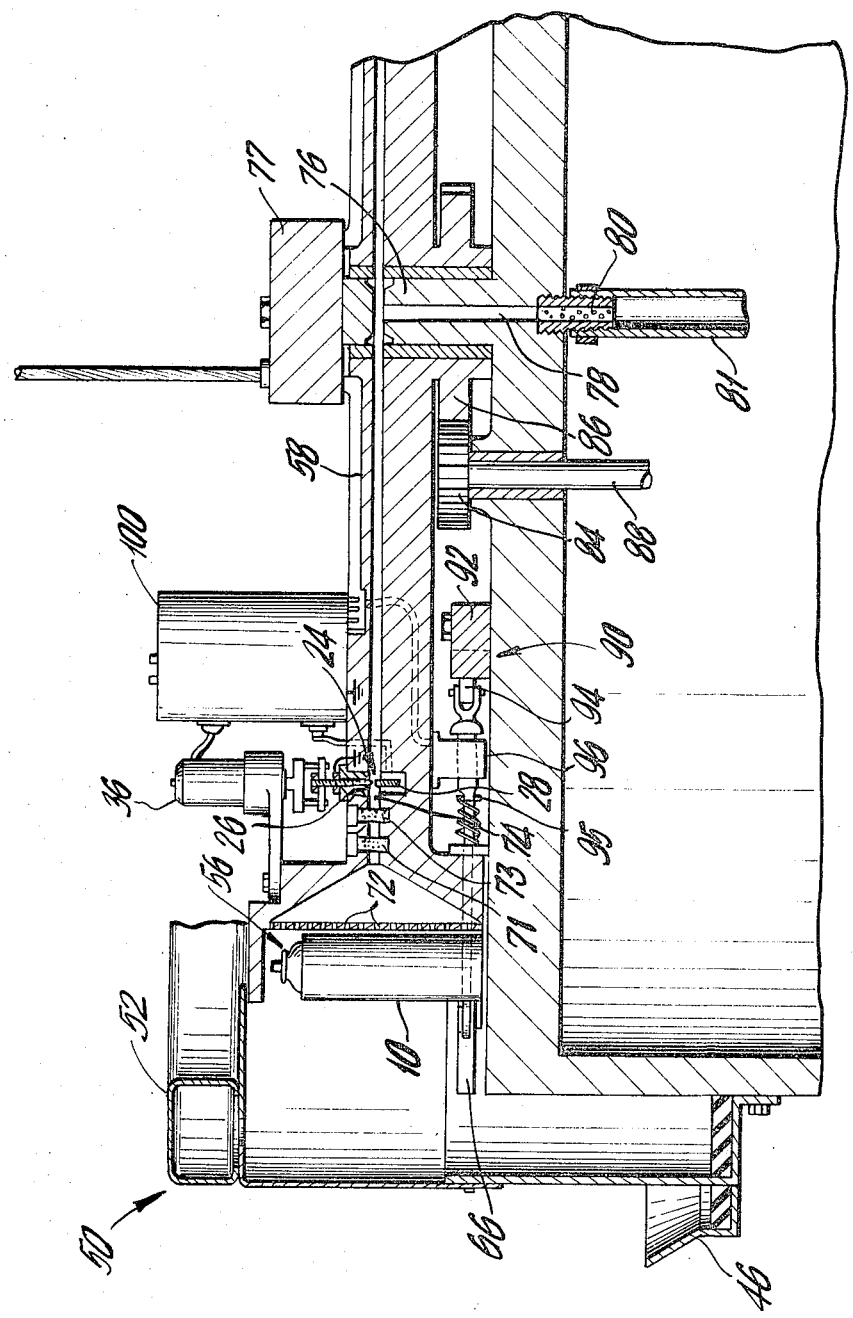
FIG. 6 is an enlarged partial cross-sectional view taken along line 6—6 of FIG. 3.

Referring to FIG. 6, a container 10 is shown positioned in a cavity 56 for leak detection. (It should be understood that the other cavities 56 of the wheel 58 are identical in structure; one cavity 56 is described for clarity). The cavity 56 includes air spreader holes 72 and an air outlet duct 74 in communication with the cavity 56 and the air spreader holes 72. A flame arrestor 71 and filter 73 may be included in the air outlet duct 74 as desired.

Electrodes 24 are mounted on the outlet duct 74. The flat electrode 28 is stationary while the pointed electrode 26 is movable toward or away from the flat electrode 28 during energization of the motor 36. The air duct 74 is arranged in the wheel 58 and extends radially outward from a central stationary shaft 76 of the stationary table 60. The central shaft 76 includes an axial air passage 78 and flame arrestor 80. A tube 81 mechanically couples the vacuum pump 22 to the air passage 78.

Air supplied to the shroud 50 is distributed to the cavity 56 by the air distributor 52 and drawn through the cavity 56, air spreader holes 72, outlet duct 74, air passage 78 and tube 81 by the action of the vacuum pump 22. The vacuum pump 22 may be any conventional pump which has sufficient capacity to draw air at the rate of about 3 feet/second, preferably 24 feet/second, past the pair of electrodes 24. An air flow of about 3 feet/second is desirable to cool the electrodes 24 sufficiently to prevent degradation. However, it is advantageous to use an increased rate of air flow to decrease the response time of the apparatus 40.

The rotatable wheel 58 may be driven by drive gear 84 which engages rotary gear 86 connected to the rotatable wheel 58. The rotatable wheel 58 and rotary gear 86 are journaled for rotation about the stationary central shaft 76. The drive gear 84 is driven by a shaft 88 coupled to a motor (not shown).

The control pawls 66 are controlled by a roller and cam drive 90. The cam 92 is mounted on the stationary table 60. Each control pawl 66 includes a roller 94 mounted on the wheel 58 for rotation therewith. Each roller 94 is mechanically coupled to its respective pawl 66 by a spring biased rod 95. A reject solenoid 38 mounted on the wheel 58 is energized when leakage is detected by the electrodes 24. When the solenoid 38 is energized its armature, which is mechanically coupled to the roller 94 retracts, lifting the roller 94 from the cam 92 and causing the control pawl 66 to move into a tangential position to allow the leaking container 10 to slide out of the cavity 56 and into the leaker catch basin 46.

The power source 30 is connected to the detector 32 and electrode spacing determinator 34, which are housed in container 10, through slip rings contained in housing 77 mounted on the stationary shaft 76.

Figure 7:
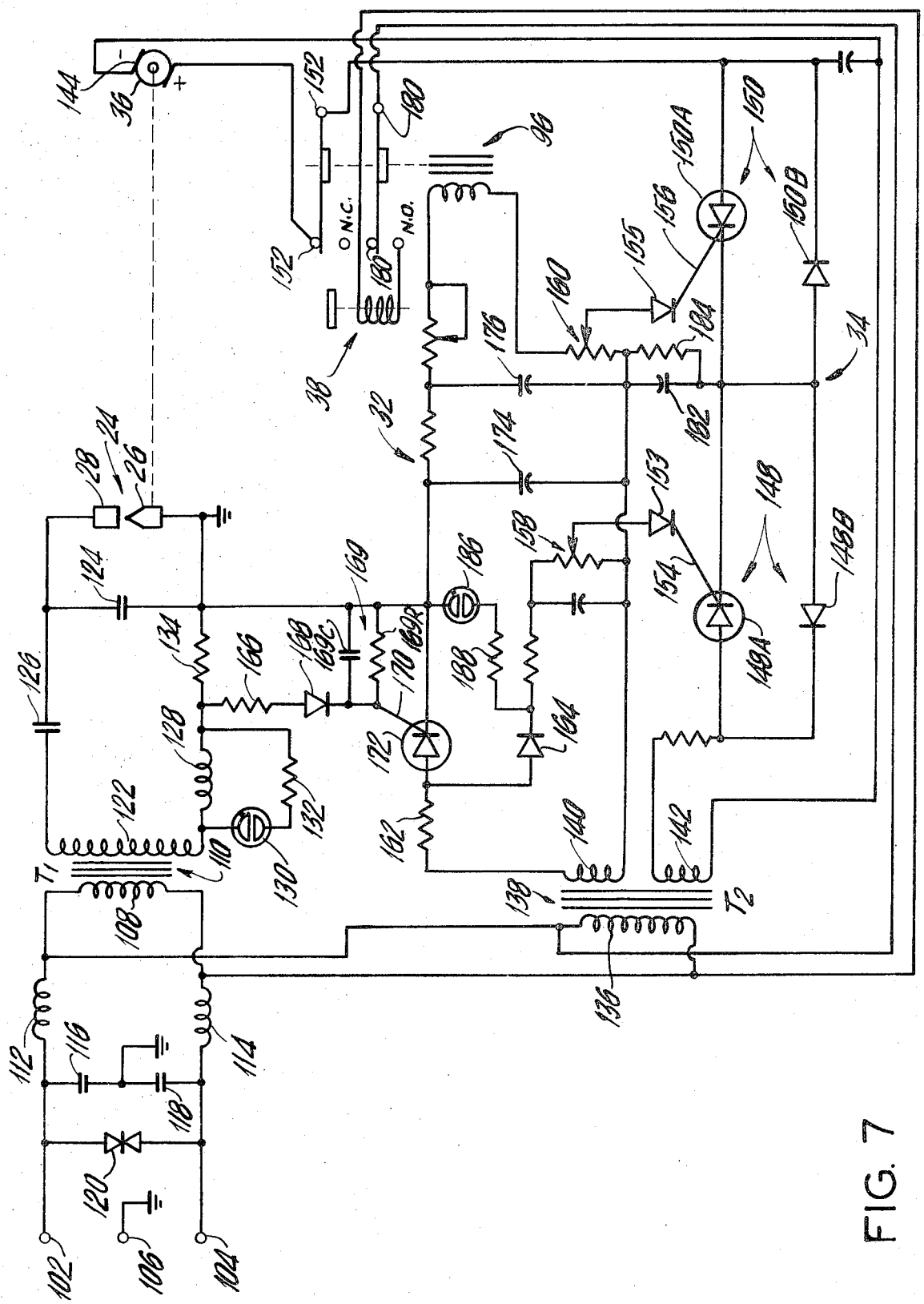
FIG. 7 is a schematic diagram of the electric circuit utilized in the detection system.

The electrical circuit for the detector 32 and electrode spacing determinator 34 is illustrated in FIG. 7. The detector 32 operates a relay 96 in response to an average rise in electrode current to cause energization of the solenoid 38 and rejection of a leaking container 10. Further, the detector 32 turns on and off in response to the erratic current flow to energize the electrode spacing determinator 34 and adjust the electrode gap.

The power source 30, which may be 60 cycle 120 volt a.c. line current, is fed to the input terminals 102, 104 and 106 (ground) of the electric circuit. The input terminals 102 and 104 are electrically connected to the primary winding 108 of a step up transformer 110 having a turns ratio, e.g., of approximately 16:1. Radio frequency (R.F.) chokes 112 and 114 are connected in series with primary winding 108 and two grounded capacitors 116 and 118 are connected in parallel with the primary winding 108 to filter out undesired R.F. transients resulting from corona and complete ionization to prevent the input terminals from acting as an antenna and radiating R.F. energy. A thyrector 120 (trademark of General Electric Co.) is connected across the input terminals 102 and 104 and in parallel with the capacitors 116 and 118 to suppress line current surges which may be sufficient to cause complete ionization between the electrodes 24, causing a "false" leakage indication.

The secondary winding 122 of the transformer 110 is connected in parallel with the electrodes 24 and a capacitor 124, and in series with a second capacitor 126; the capacitors 124 and 126 prevent continued ionization between the electrodes 24 after the contaminated stream of air has passed the electrodes 24. The series capacitor 126 limits the rate of the rise or fall in current caused by transient signals at the electrodes 24 which may cause ionization to continue once started even though the air stream passing between the electrodes 24 is substantially pure. The parallel capacitor 124 dampens the current flow between the electrodes 24, allowing transients and a large proportion of the high frequency (radio frequency) current to flow across it rather than across the electrodes 24. Also connected in series between the secondary winding 122 and the electrodes 24 is an R.F. choke 128. A neon indicator lamp 130 and associated resistor 132 are arranged in parallel with the R.F. choke 128. The lamp 130 flickers during the presence of a corona, i.e., mode 1 operation, but remains on when complete ionization occurs, i.e., mode 2 operation. An output resistor 134 is also connected in series with the electrodes 24.

The primary winding 108 is connected in parallel with the primary winding 136 of a second transformer 138. The transformer 108 has split secondary windings 140 and 142. One end of the secondary winding 142 is electrically connected to the negative terminal 144 of motor 36. The other end of the secondary winding 142 is electrically connected to the positive terminal 146 of motor 36 through a pair of series connected diodes and SCRs indicated generally at 148 and 150, respectively, and relay contacts 152.

The inputs to the SCR gate terminals 154 and 156 of SCR's 148A and 150A, respectively, are obtained from two variable resistors 158 and 160 and gate diodes 153 and 155, respectively. The diodes 153 and 155 prevent reverse current flow in the gate circuits of SCR's 148A and 150A, respectively. The resistor 158 is initially manually adjusted to a position which allows sufficient current to flow from the secondary winding 140 through resistor 162 and diode 153 to the gate terminal 154 to cause the SCR 148A to conduct during a portion of every half cycle of the a.c. voltage input to the transformer 138.

A resistor 166 and rectifying diode 168 electrically feed the signal across the output resistor 134 through an RC filter circuit 169 including resistor 169R and capacitor 169C, to the gate terminal 170 of SCR 172. When the SCR 172 is turned on due to the voltage drop across resistor 162, insufficient current is supplied to the gate terminal 154 to turn the SCR 148A on. That is, when SCR 172 is on SCR 148A is off.

Small corona current flowing through resistor 134 and the gate terminal 170 of the SCR 172 is insufficient to turn SCR 172 on. Thus, SCR 148A is on completing the circuit to the motor 36 through rectifying diode 150B causing the motor 36 to advance the pointed electrode 26 slowly toward the flat electrode 28 to decrease the electrode gap. When the gap spacing is properly set, both corona and erratic bursts in current add to cause SCR 172 to flicker on and off. These erratic current bursts are of sufficient regularity to charge parallel filter capacitors 174 and 176. The discharge current from these capacitors 174 and 176 is insufficient to close the normally open contacts 180 of relay 96. Thus, the normally open contacts 180 remain open. Further, there is insufficient current flowing through resistor 160 to gate terminal 156 to cause SCR 150A to turn on.

However, this resulting current does charge capacitor 182 which is in the return circuit of both SCR 148A and SCR 150A. The charge on capacitor 182 slowly leaks off through parallel resistor 184 causing a back e.m.f. at the SCR gate terminals 154 and 156 which is sufficient to shut off the SCR's 148A and 150A. Thus, both 148A and 150A are off when the electrodes 24 are correctly spaced and the motor 36 is de-energized.

If the substantially pure air flowing past the electrodes 24 slowly becomes slightly more contaminated with organic molecules, the erratic current flow between the electrodes becomes greater and more frequent. This increased frequency of erratic current flow allows sufficient current to be supplied to the gate terminal 156 to turn the SCR 150A on. SCR 150A is on during the time that the capacitor 182 is being charged. Thus, the circuit to the motor 36 is completed through SCR 150A and diode 148B, causing the motor 36 to rotate the pointed electrode 26 slowly away from the flat electrode 28 in the direction to increase the electrode gap.

The time it takes to charge the capacitor 182 and the voltage to which it is charged is dependent upon the erratic nature of the current flowing between the electrodes 24. The electrode gap spacing is properly adjusted by the motor 36 to maintain a corona about the pointed electrode 26 with a small erratic flow of current in a stream of substantially pure air.

Resistor 160 may be adjusted to allow slightly more on time for SCR 150A than is necessary to ensure that the electrode gap spacing has increased sufficiently to prevent a false indication during excessive erratic current flow. However, this may cause the detector circuit 32 to be slightly less sensitive to contaminated air for a while. If the electrode gap spacing is proper, the capacitor 182 introduces a back e.m.f. and that keeps both SCR 148A and SCR 150A off. Should the electrode gap result in a small corona, but no erratic current pulses for a period of time due to the air stream becoming purer, the charge on the capacitor 182 drops causing SCR 148A to conduct, energizing the motor 36 to decrease the electrode gap spacing. If suddenly a stream of contaminated air (including organic molecules) is conveyed between the electrodes 24, sufficient current is transmitted to the gate terminal 170 of SCR 172 to keep it conducting long enough to supply enough current to activate relay 96 to close normally open contacts 180 and open normally closed contacts 152. Solenoid 38 is thus energized and the motor 36 is de-energized.

A neon lamp 186 and associated series resistance 188 are connected across the SCR 172 and rectifying diode 164. The neon lamp 186 is shorted out when SCR 172 is on, thus giving a visual indication of the condition of SCR 172.

It should be noted that if a container 10 has substantial leakage, the control pawl 66 of the cavity 56 in which it is sought to be positioned will maintain its outwardly extending position due to the energization of the solenoid 38 by the detector 32. The container 10 will thus slide off the table 60 without ever entering the cavity 56. Thus, the apparatus 40 is not prone to give false leakage indications which may result if a container having substantial leakage is introduced into the cavity 56, since such a container may leave a residue of contaminates which would continue to contaminate the substantially pure air.

Exemplary values for the numbered passive circuit components and the suggested types of solid state components are as follows:

| Capacitors | Value in Microfarads |
| --- | --- |
| 116, 118 | .01 |
| 124 | .00011 |
| 126 | .005 |
| 169C | .0005 |
| 174, 176 | 80 |
| 182 | 1000 |

| Resistors | Value in Ohms |
| --- | --- |
| 132 | 100 K |
| 134 | 2.2 K |
| 158, 160 | 1 K |
| 162 | 1 K |
| 166 | 68 |
| 169R | 10 K |
| 184 | 10 K |
| 188 | 100 K |

| Solid State | |
| --- | --- |
| Diodes | IN 2071 |
| Thyrector | G.E. X-14 |
| SCRs (148A, 150A, and 172) | I.R. 106B or G.E. C-106B |

It should be apparent to those skilled in the art that various modifications may be made in the present invention without departing from the spirit or scope thereof as described in the specification and defined in the appended claims.

What is claimed is:

1. A method of detecting for leaking containers comprising the steps of:
    positioning the container adjacent a pair of spaced electrodes;
    applying an electric field to the electrodes sufficient to maintain a corona about one electrode with small, erratic current flow between the electrodes;
    directing a stream of substantially pure air past the container and between the pair of electrodes, the stream of substantially pure air conveying any organic molecules present on and adjacent the exterior surface of the container between the pair of spaced electrodes causing a greater, more constant flow of current between the pair of spaced electrodes; and
    detecting any resulting greater, more constant current flow to indicate a leaking container.

2. The method of claim 1 including the step of:
    dehumidifying the stream of substantially pure air to below 50 percent humidity prior to the step of directing it past the container.

3. The method of claim 1 wherein:
    the stream of substantially pure air is of sufficient velocity to cool and prevent degradation of the electrodes.

4. The method of claim 1 including the step of:
    automatically adjusting the spacing between the electrodes in response to the composition of the stream of substantially pure air present between the electrodes to maintain the corona at one electrode with small erratic current flow between the electrodes.

5. The method of claim 1 wherein:
    the stream of substantially pure air includes less than about 500 parts per million by weight of other gases, with less than 100 parts per million by weight of gases that are easily ionized.

6. A method of detecting for leaking containers comprising the steps of:
    positioning a container which includes hydrocarbon solvents upstream from a pair of spaced electrodes;
    impressing an electric field of sufficient strength upon the pair of spaced electrodes to form a corona about one of the electrodes with a small average current flow between the electrodes;
    flowing a stream of substantially pure air past the exterior surface of the container and between the electrodes; and
    detecting container leakage by measuring the increase in average current flow as a result of the presence of organic molecules between the electrodes.

7. A method of detecting for leaking containers comprising the steps of:
    positioning a container which includes organic compounds upstream from a pair of spaced electrodes;
    impressing an electric field of sufficient strength upon the pair of spaced electrodes to form a corona about one of the electrodes with a small average current flow between the electrodes;

flowing a stream of substantially pure air past the exterior surface of the container and between the electrodes; and detecting container leakage by measuring the increase in average current flow as a result of the presence of organic molecules between the electrodes.

8. An apparatus for automatically detecting and rejecting leaking containers comprising:
a stationary table;
first means arranged adjacent said table for transmitting containers to be tested to said table;
second means arranged adjacent said table for transmitting non-leaking containers from said table after testing;
a wheel rotatably mounted on said table and including a plurality of chambers for receiving the containers to be tested;
means for supplying substantially pure air to said chambers;
a pair of electrodes positioned adjacent each of said chambers;
means for communicating with said chambers and said electrodes;
keeper means for engaging the containers supplied to said table by said first transmitting means to move the containers into said chambers for testing;
means for detecting the current flow between each pair of electrodes;
means for moving said keeper means to allow the exit of the containers from said chambers in response to a signal for said detection means; and
means for automatically adjusting the gap between said electrodes to maintain a corona about one electrode with a small erratic current flow between said electrodes.

9. The apparatus of claim 8 wherein:
said electrode gap adjusting means includes a motor mechanically linked to one of said electrodes for movement of said one electrode toward and away from said other electrode;
first gate means responsive to small average current flow to energize said motor, causing movement of said one electrode toward said other electrode to provide the proper gap between said electrodes and to maintain a corona about one of said electrodes with a small erratic current flow between said electrodes;
second gate means responsive to greater, more constant erratic current flow to supply a signal to said motor for moving said one electrode away from said other electrode.

10. An apparatus as recited in claim 9 wherein:
each of said first and second gate means includes an SCR and a variable resistor electrically coupled to the gate terminal of said SCR.

11. An apparatus for automatically detecting and rejecting leaking containers comprising:
a stationary table;
first means arranged adjacent said table for transmitting containers to be tested to said table;
second means arranged adjacent said table for transmitting non-leaking containers from said table after testing;
a wheel rotatably mounted on said table and including a plurality of chambers for receiving the containers to be tested;
means for supplying substantially pure air to said chambers;
a pair of electrodes positioned adjacent each of said chambers;
means for communicating with said chambers and said electrodes;
keeper means for engaging the containers supplied to said table by said first transmitting means to move the containers into said chambers for testing;
means for detecting the current flow between each pair of electrodes; and
means for moving said keeper means to allow the exit of the containers from said chambers in response to a signal from said detection means;
said keeper means including a cam, a roller for contact with said cam, a roller arm, and a pivotable pawl mechanically coupled to said roller arm, said pawl opening or closing in response to the movement of said roller on said cam.

12. An apparatus for automatically detecting and rejecting leaking containers comprising:
a stationary table;
first means arranged adjacent said table for transmitting containers to be tested to said table;
second means arranged adjacent said table for transmitting non-leaking containers from said table after testing;
a wheel rotatably mounted on said table and including a plurality of chambers for receiving the containers to be tested;
means for supplying substantially pure air to said chambers;
a pair of electrodes positioned adjacent each of said chambers;
means for communicating with said chambers and said electrodes;
keeper means for engaging the containers supplied to said table by said first transmitting means to move the containers into said chambers for testing;
means for detecting the current flow between each pair of electrodes; and
means for moving said keeper means to allow the exit of the containers from said chambers in response to a signal from said detection means;
said detecting means including a source of alternating current, a step-up transformer electrically connected to said source of alternating current and means for limiting the amount of current flow between said electrodes.

13. The apparatus of claim 12, wherein:
said means for limiting the amount of current flow includes first means connected in series with said pair of electrodes for attenuating transients, and second means connected in parallel with said electrodes for dampening high frequency current flow between said electrodes.

* * * * *